(12) United States Patent
Yamamoto

(10) Patent No.: US 6,650,973 B2
(45) Date of Patent: Nov. 18, 2003

(54) FLIGHT CONTROL SYSTEM

(75) Inventor: Tsuyoshi Yamamoto, Gifu (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 10/319,558

(22) Filed: Dec. 16, 2002

(65) Prior Publication Data

US 2003/0120399 A1 Jun. 26, 2003

(30) Foreign Application Priority Data

Dec. 26, 2001 (JP) ........................................ 2001-393004

(51) Int. Cl.[7] ................................................. G05D 1/00
(52) U.S. Cl. ................................ 701/4; 701/3; 701/11; 244/175
(58) Field of Search .............................. 701/4, 3, 11, 8, 701/14; 244/175, 195, 196, 221; 318/564

(56) References Cited

U.S. PATENT DOCUMENTS 4,849,893 A * 7/1989 Page et al. ...................... 701/3
6,257,529 B1 * 7/2001 Kubo et al. .................. 244/221

* cited by examiner

Primary Examiner—Marthe Y. Marc-Coleman
(74) Attorney, Agent, or Firm—Venable LLP; Andrew C. Aitkin

(57) ABSTRACT

A flight control system for controlling a flight of an aircraft, having an actuator for actuating flight control surfaces and outputting a feedback signal in return; a flight control computer for operating the actuator; and an actuator control computer for controlling the operation of the actuator. The flight control computer comprises an FCC processor for generating an instruction signal to operate the actuator on the basis of an operational instruction signal inputted from a pilot and a state signal indicative of the state of an aircraft, and generating a reference signal on the basis of the instruction signal and the feedback signal from the actuator. The actuator control computer comprises an ACC processor for generating an actuator control signal on the basis of the instruction signal generated by the FCC processor and the feedback signal from the actuator, and a servo amplifier for amplifying the actuator control signal generated by the ACC processor to be outputted to the actuator. The actuator is operative to actuate the flight control surfaces in accordance with the actuator control signal amplified by the servo amplifier and output a feedback signal in return. The flight control computer further comprises a comparing section for comparing the actuator control signal generated by the ACC processor with the reference signal generated by the FCC processor to detect a failure wherein the FCC processor is different in design from the ACC processor.

11 Claims, 2 Drawing Sheets

FLIGHT CONTROL SYSTEM

BACKGROUND OF THE INVENTION

1. Field of the Invention

The present invention relates to a flight control system for controlling a flight of an aircraft. More particularly, the present invention is concerned with a flight control system including an actuator control computer and a flight control computer.

2. Description of the Related Art

Up until now, there has been proposed a wide variety of flight control systems for controlling a flight of an aircraft. One typical example of the conventional flight control system is known as Fly By Wire System, hereinlater simply referred to as "FBW" system, which enables to control an actuator actuating flight control surfaces, for example, ailerons, by means of electric signals. The conventional flight control system 1100 is exemplified and shown in FIG. 2 as comprising an actuator control computer 1300, hereinlater simply referred to as "ACC", a flight control computer 1200, hereinlater simply referred to as "FCC", and an actuator 1400.

The FCC 1200 is operative to receive an operational instruction 1500a from a pilot and a state signal 1500b indicative of the state of the aircraft from the aircraft, and generate an instruction signal 1100a to operate the actuator 1400 of the aircraft. The actuator 1400 is operative to actuate the flight control surfaces and output a feedback signal 1400a in return. The ACC 1300 is operative to receive the instruction signal 1100a from the FCC 1200 and the feedback signal 1400a from the actuator 1400 to generate an actuator control signal 1100b on the basis of the instruction signal and the feedback signal thus received.

Furthermore, the conventional flight control system 1100 employs various fault detections to prevent failures from occurring in the FCC 1200 and the ACC 1300 because of the fact that the conventional flight control system 1100 is required to accurately control a flight of an aircraft. A processor or software is subjected to failures such as, for example, a failure randomly occurring, hereinlater simply referred to as "random failures". The FCC 1200 may comprise, for example, a plurality of FCC microprocessors identical in design and software with one another and have a plurality of FCC microprocessors respectively generate a plurality of instruction signals 1100a to detect random failures occurring in the processor or software. A processor or software is subjected to another failure consequently occurring due to the characteristics inherent in the processor or software, hereinlater simply referred to as "generic failures". The FCC 1200 may comprise, for example, a plurality of FCC microprocessors different in design and software from one another and have a plurality of FCC microprocessors respectively generate a plurality of instruction signals 1100a to detect generic failures occurring in the processor or software. While it has been described in the above that the FCC 1200 may comprise a plurality of FCC microprocessors to detect random and generic failures, it is needless to mention that the ACC 1300 may comprise a plurality of ACC microprocessors to detect random and generic failures in the same manner.

The conventional flight control system 1100, however, encounters a drawback that the conventional flight control system 1100 is required to comprise, for example, a plurality of ACC microprocessors different in design and software from one another and have a plurality of ACC microprocessors respectively generate a plurality of instruction signals 100a to detect generic failures consequently occurring due to the characteristics inherent in the ACC microprocessor or software related to the ACC microprocessor. This leads to the fact that the conventional flight control system 1100 requires suppliers to develop and produce a plurality of microprocessors different from one another in design and a plurality of software different from one another in design in order to detect generic failures due to the characteristics inherent in the processor or software, thereby making it difficult for the suppliers to reduce the development and manufacturing costs. The present invention contemplates resolution of such problem.

SUMMARY OF THE INVENTION

It is therefore an object of the present invention to provide a flight control system, which does not require suppliers to develop and produce a plurality of ACC processors 320 different from one another in design and software in order to detect failures, thereby making it possible for the suppliers to reduce the development and manufacturing costs while enabling to detect generic failures consequently occurring due to the characteristics inherent in the ACC processor or software related to the ACC processor.

It is another object of the present invention to provide a flight control system, which does not require suppliers to develop and produce a plurality of ACC processors 320 different from one another in design and software in order to detect failures, thereby making it possible for the suppliers to reduce the development and manufacturing costs while enabling to prevent an actuator from being controlled by failed ACC.

In accordance with a first aspect of the present invention, there is provided a flight control system for controlling a flight of an aircraft, comprising: an actuator for actuating flight control surfaces; a flight control computer for operating the actuator; and an actuator control computer for controlling the operation of the actuator. The flight control computer comprises: an FCC processor for generating an instruction signal to operate the actuator on the basis of an operational instruction signal inputted from a pilot and a state signal indicative of the state of an aircraft, a reference signal on the basis of the instruction signal and a feedback signal from the actuator. The actuator control computer comprises: an ACC processor for generating an actuator control signal on the basis of the instruction signal generated by the FCC processor and the feedback signal from the actuator, and a servo amplifier for amplifying the actuator control signal generated by the ACC processor to be outputted to the actuator. The actuator is operative to actuate the flight control surfaces in accordance with the actuator control signal amplified by the servo amplifier. In the aforesaid flight control system, the flight control computer further comprises: a comparing section for comparing the actuator control signal generated by the ACC processor with the reference signal generated by the FCC processor to detect a failure. The FCC processor is different in design from the ACC processor. In the aforesaid flight control system, the FCC processor may generate the reference signal in accordance with FCC software. The ACC processor may generate the actuator control signal in accordance with ACC software. The FCC software may be different from the ACC software in design.

In accordance with a second aspect of the present invention, there is provided a flight control system for controlling a flight of an aircraft, comprising: an actuator for actuating flight control surfaces; a flight control computer for operating the actuator; and an actuator control computer for controlling the operation of the actuator. The flight control computer comprises: an FCC processor for generating an instruction signal to operate the actuator on the basis of an operational instruction signal inputted from a pilot and a state signal indicative of the state of an aircraft, a reference signal on the basis of the instruction signal and a feedback signal from the actuator. The actuator control computer comprises: an ACC processor for generating an actuator control signal on the basis of the instruction signal generated by the FCC processor and the feedback signal from the actuator, and a servo amplifier for amplifying the actuator control signal generated by the ACC processor to be outputted to the actuator. The actuator is operative to actuate the flight control surfaces in accordance with the actuator control signal amplified by the servo amplifier. In the aforesaid flight control system, the flight control computer further comprises: a comparing section for comparing the actuator control signal generated by the ACC processor with the reference signal generated by the FCC processor to detect a failure. The FCC processor is operative to generate the reference signal in accordance with FCC software. The ACC processor is operative to generate the actuator control signal in accordance with ACC software. The FCC software is different from the ACC software in design.

In the aforesaid flight control system, the FCC processor may receive the feedback signal from the actuator not through the ACC processor. The comparing section may receive the actuator control signal generated by the ACC processor not through the ACC processor.

In accordance with a third aspect of the present invention, the FCC processor comprises: an instruction signal generating section for generating an instruction signal to operate the actuator on the basis of an operational instruction signal inputted from a pilot and a state signal indicative of the state of an aircraft, and a reference signal generating section for generating a reference signal on the basis of the instruction signal generated by the instruction signal generating section and a feedback signal from the actuator. The comparing section is operative to compare the actuator control signal generated by the ACC processor with the reference signal generated by the reference signal generating section to detect a failure.

In accordance with a fourth aspect of the present invention, the actuator control computer further comprises: a digital analog converter for converting the actuator control signal generated by the ACC processor from digital to analog format to be outputted to the servo amplifier and the FCC processor. The servo amplifier is operative to amplify the actuator control signal in analog format converted by the digital analog converter to be outputted to the actuator. The comparing section is operative to compare the actuator control signal in analog format converted by the digital analog converter with the reference signal generated by the FCC processor to detect a failure.

In the aforesaid flight control system, the actuator control computer may further comprise a control prevention section for preventing the actuator from being controlled by the actuator control computer. The comparing section may compare the actuator control signal generated by the ACC processor with the reference signal generated by the FCC processor to generate a control prevention signal in accordance with the result of the comparison, and the control prevention section may prevent the actuator from being controlled by the actuator control computer in response to the control prevention signal generated by the comparing section. The comparing section may output the control prevention signal to the control prevention section not through the ACC processor. The comparing section may form part of the FCC processor.

The aforesaid flight control system may further comprise a data bus for connecting the actuator control computer with the flight control computer so that the actuator control computer is operative to receive the instruction signal and the control prevention signal from the flight control computer and transmit the actuator control signal and the feedback signal to the flight control computer.

BRIEF DESCRIPTION OF THE DRAWINGS

The present invention and many of the advantages thereof will be better understood from the following detailed description when considered in connection with the accompanying drawings, wherein.

DESCRIPTION OF THE PREFERRED EMBODIMENTS

Figure 1:
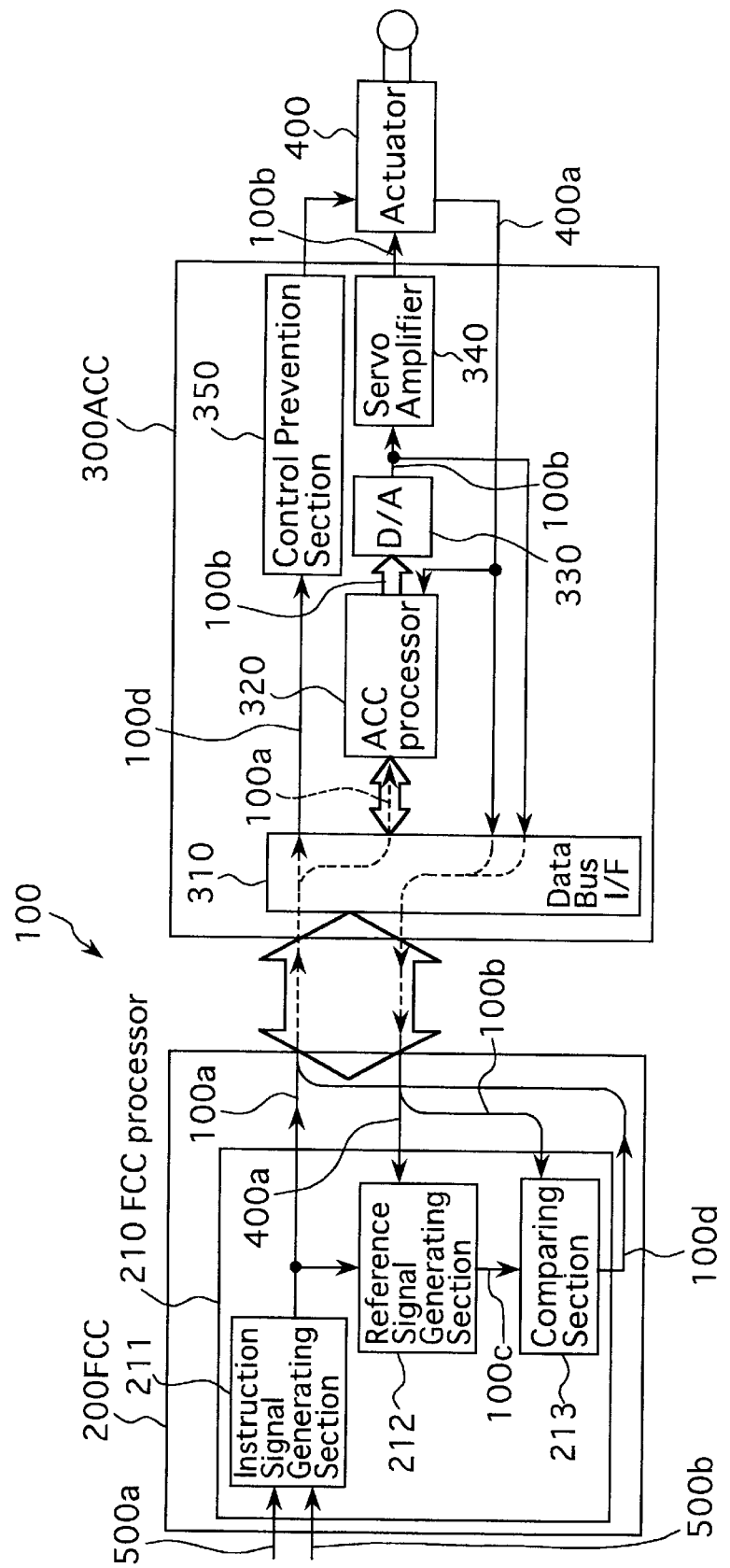
FIG. 1 is a block diagram of a preferred embodiment of a flight control system according to the present invention.
Figure 2:
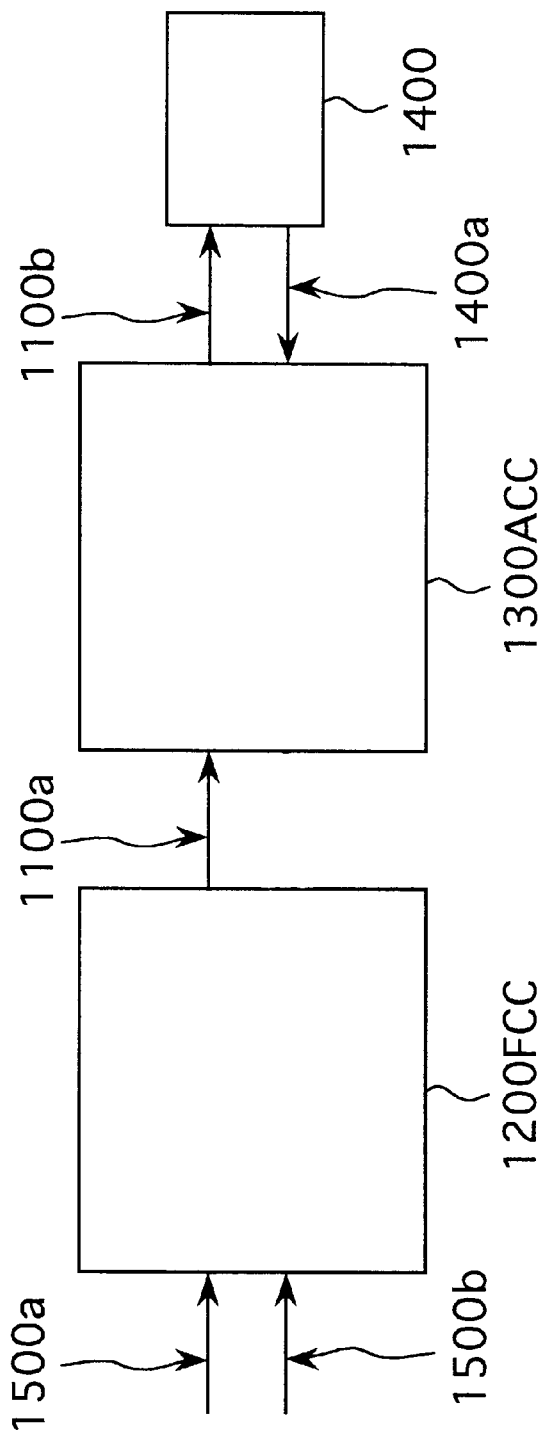
FIG. 2 is a block diagram of a conventional flight control system.

The preferred embodiments of the flight control system 100 according to the present invention will be described hereinafter with reference to the drawings shown in FIG. 1. Throughout the following detailed description, similar reference characters refer to similar elements in all figures of the drawings.

Referring now to FIG. 1 of the drawings, there is shown a preferred embodiment of the flight control system 100 for controlling a flight of an aircraft. The flight control system 100 is exemplified and shown in FIG. 1 as comprising an actuator 400 for actuating flight control surfaces, not shown, and outputting a feedback signal 400a in return, a flight control computer 200, i.e., FCC 200, for operating the actuator 400, and an actuator control computer 300, i.e., ACC 300, for controlling the operation of the actuator 400. The flight control surfaces may be, for example, ailerons. The flight control system 100 thus constructed is an FBW system which permits a pilot, not shown, inputting an operational instruction 500a to control an actuator 400 actuating the flight control surfaces in accordance with the operational instruction 500a by means of electric signals.

The description hereinlater will be directed to the FCC 200. The FCC 200 comprises an FCC processor 210. The FCC processor 210 is adapted to generate an instruction signal 100a to operate the actuator 400 on the basis of an operational instruction signal 500a inputted from a pilot and a state signal 500b indicative of the state of an aircraft received from the aircraft. Furthermore, the FCC processor 210 is adapted to generate a reference signal 100c on the basis of the instruction signal 100a thus generated and the feedback signal 400a outputted from the actuator 400. The FCC processor 210 may be, for example, a microprocessor. More specifically, the FCC processor 210 comprises an instruction signal generating section 211, and a reference signal generating section 212. The instruction signal generating section 211 is adapted to generate an instruction signal 100a to operate the actuator 400 on the basis of the operational instruction signal 500a inputted from a pilot and the state signal 500b indicative of the state of an aircraft received from the aircraft. The reference signal generating section 212 is adapted to generate the reference signal 100c on the basis of the instruction signal 100a generated by the instruction signal generating section 211 and the feedback signal 400a outputted from the actuator 400.

The description hereinlater will be directed to the ACC 300. The ACC 300 comprises an ACC processor 320 and a servo amplifier 340. The ACC processor 320 is adapted to generate an actuator control signal 100b on the basis of the instruction signal 100a generated by the FCC processor 210 and the feedback signal 400a from the actuator 400. The servo amplifier 340 is adapted to amplify the actuator control signal 100b generated by the ACC processor 320 to be outputted to the actuator 400. The actuator 400 is adapted to actuate the flight control surfaces in accordance with the actuator control signal 100b amplified by the servo amplifier 340 and output a feedback signal 400a in return. The ACC processor 320 may be, for example, a microprocessor. The FCC processor 210 forming part of the FCC 200 is different in design from the ACC processor 320 forming part of the ACC 300. The FCC 200 further comprises: a comparing section 213. The comparing section 213 is adapted to compare the actuator control signal 100b generated by the ACC processor 320 with the reference signal 100c generated by the FCC processor 210 to detect a failure.

Preferably, the flight control system 100 may further comprise a data bus interface 310. The data bus interface 310 is adapted to connect the ACC 300 with the FCC 200 so that the ACC 300 is operative to receive the instruction signal 100a and a control prevention signal 100d, which will be described later, from the FCC 200 and transmit the actuator control signal 100b and the feedback signal 400a to the FCC 200. Preferably, the ACC 300 may further comprise a digital analog converter 330, which is shown in FIG. 1 as "D/A". The digital analog converter 330 is adapted to convert the actuator control signal 100b generated by the ACC processor 320 from digital to analog format to be outputted to the servo amplifier 340 and the FCC processor 210. The servo amplifier 340 is operative to amplify the actuator control signal 100b in analog format converted by the digital analog converter 330 to be outputted to the actuator 400. The comparing section 213 is operative to compare the actuator control signal 100b in analog format converted by the digital analog converter 330 with the reference signal 100c generated by the FCC processor 210 to detect a failure. More preferably, the FCC processor 210 forming part of the FCC 200 may receive the feedback signal 400a from the actuator 400 not through the ACC processor 320.

The FCC processor 210 is operative to generate the reference signal 100c in accordance with FCC software, and the ACC processor 320 is operative to generate the actuator control signal 100b in accordance with ACC software. Preferably, the FCC software may be different in design from the ACC software. More preferably, the comparing section 213 may receive the actuator control signal 100b generated by the ACC processor 320 not through the ACC processor 320.

The ACC 300 may further comprise a control prevention section 350 for preventing the actuator 400 from being controlled by the ACC 300. The comparing section 213 may compare the actuator control signal 100b generated by the ACC processor 320 with the reference signal 100c generated by the FCC processor 210 to generate a control prevention signal 100d in accordance with the result of the comparison. The control prevention section 350 may prevent the actuator 400 from being controlled by the ACC 300 in response to the control prevention signal 100d generated by the comparing section 213. Preferably, the comparing section 213 may output the control prevention signal 100d to the control prevention section 350 not through the ACC processor 320. Preferably, the comparing section 213 may form part of the FCC processor 210.

The operation of the flight control system 100 according to the present invention will be described hereinlater with reference to the drawings shown in FIG. 1.

The FCC 200 of the flight control system 100 is operated to receive an instruction signal 500a from a pilot and a state signal 500b indicative of the state of the aircraft from the aircraft. The FCC processor 210 is operated to generate an instruction signal 100a to operate the actuator 400 on the basis of the operational instruction signal 500a and the state signal 500b indicative of the state of an aircraft thus received. The FCC 200 is operated to receive a feedback signal 400a from the actuator 400. The FCC 200 is operated to generate a reference signal 100c on the basis of the instruction signal 100a thus generated and the feedback signal 400a thus received.

More specifically, the instruction signal generating section 211 is operated to receive an operational instruction signal 500a inputted from a pilot and a state signal 500b indicative of the state of an aircraft from the aircraft, and generate an instruction signal 100a to operate the actuator 400 on the basis of the operational instruction signal 500a and the state signal 500b thus received. The ACC processor 320 is operated to receive the instruction signal 100a generated by the instruction signal generating section 211 through the data bus interface 310 from the FCC 200, and generate an actuator control signal 100b on the basis of the instruction signal 100a thus received and the feedback signal 400a from the actuator 400. The digital analog converter 330 is operated to convert the actuator control signal 100b generated by the ACC processor 320 from digital to analog format to be outputted to the servo amplifier 340 and the FCC processor 210. The servo amplifier 340 is operated to amplify the actuator control signal 100b in analog format converted by the digital analog converter 330 to be outputted to the actuator 400. The actuator 400 is operated to actuate the flight control surfaces in accordance with the actuator control signal 100b amplified by the servo amplifier 340 and output a feedback signal 400a in return.

The flight control system 100 thus constructed makes it possible for a pilot inputting an operational instruction signal 500a to actuate the flight control surfaces, for example, ailerons, in accordance with the operational instruction signal 500a.

As described earlier, the instruction signal 100a generated by the instruction signal generating section 211 is outputted not only to the ACC processor 320 but also to the reference signal generating section 212. The reference signal generating section 212 is operated to receive the instruction signal 100a from the instruction signal generating section 211 and a feedback signal 400a from the actuator 400 through the data bus interface 310, and generate a reference signal 100c on the basis of the instruction signal 100a and the feedback signal 400a thus received.

The comparing section 213 is operated to receive the reference signal 100c from the instruction signal generating section 211 and the actuator control signal 100b in analog format converted by the digital analog converter 330 through the data bus interface 310 from the ACC 300, and compare the actuator control signal 100b with the reference signal 100c to detect a generic failure.

More specifically, the comparing section 213 is operated to compare the actuator control signal 100b with the reference signal 100c by judging whether the actuator control signal 100b is equal to the reference signal 100c or not. The comparing section 213 is operated to determine that no generic failure occurs in the ACC processor 320 if it is judged that the actuator control signal 100b is equal to the reference signal 100c. The comparing section 213, on the other hand, is operated to determine that a generic failure occurs in the ACC processor 320 if it is judged that the actuator control signal 100b is not equal to the reference signal 100c. The comparing section 213 is operated to generate a control prevention signal 100d if it is judged that the actuator control signal 100b is not equal to the reference signal 100c and determined that a generic failure occurs in the ACC processor 320.

The control prevention section 350 is operated to receive the control prevention signal 100d from the comparison section 213 through the data bus interface 310. The control prevention section 350 is operated to prevent the actuator 400 from being controlled by the ACC 300 in response to the control prevention signal 100d generated by the comparing section 213. More specifically, the actuator 400 may assume operation modes including a control mode allowing the ACC processor 320 to control the operation of the actuator 400, and another operation mode such as, for example, a prevention mode, not allowing the ACC processor 320 to control the operation of the actuator 400. The actuator 400, in principle, is operated to assume the control mode allowing the ACC processor 320 to control the operation of the actuator 400 as long as no failure is detected. The control prevention section 350 is operated to switch the actuator 400 from the control mode to the prevention mode not allowing the ACC processor 320 to control the operation of the actuator 400 in response to the control prevention signal 100d.

As will be seen from the foregoing description, it is to be understood that the preferred embodiment of the flight control system 100 according to the present invention, in which the FCC processor 210 is operative to generate a reference signal 100c, the ACC processor 320 is operative to generate an actuator control signal 100b, and the comparing section 213 is operative to compare the actuator control signal 100b generated by the ACC processor 320 with the reference signal 100c generated by the reference signal generating section 212 wherein the FCC processor 210 is different in design from the ACC processor 320, can detect a generic failure consequently occurring in the ACC processor 320 due to the characteristics inherent in the ACC processor 320 because of the fact that the FCC processor 210 is different in design from the ACC processor 320. Preferably, the manufacturer of the FCC processor 210 of the FCC 200 should be different from the manufacturer of the ACC processor 320 of the ACC 300.

The flight control system 100 thus constructed does not require suppliers to develop and produce a plurality of ACC processors 320 different from one another in design in order to detect generic failures, thereby making it possible for the suppliers to reduce the development and manufacturing costs. The flight control system 100 thus constructed does not require suppliers to develop and produce a plurality of ACC processors 320 different from one another in design in order to detect generic failures, which can reduce the development and manufacturing costs of the flight control system while enabling to prevent the actuator 400 from being controlled by failed ACC 300.

According to the present invention, the flight control system 100, in which the FCC processor 210 is operative to receive the feedback signal 400a from the actuator 400 not through the ACC processor 320, can detect a failure more reliably than the conventional flight control system in which the FCC processor 210 is operative to receive the feedback signal 400a from the actuator 400 through the ACC processor 320.

In the flight control system 100 according to the present invention, the comparing section 213 may receive the actuator control signal 100b generated by the ACC processor 320 not through the ACC processor 320. The flight control system 100 thus constructed can detect a generic failure more reliably than the conventional flight control system in which the comparing section 213 is operative to receive the actuator control signal 100b generated by the ACC processor 320 through the ACC processor 320.

According to the present invention, the flight control system 100 may comprise a digital analog converter 330 for converting the actuator control signal 100b from digital to analog format. In the flight control system 100, the comparing section 213 is operative to receive the actuator control signal 100b in analog format converted by the digital analog converter 330 and the reference signal 100c generated by the FCC processor 210, and compare the actuator control signal 100b with the reference signal 100c to detect a failure. The flight control system 100 thus constructed can detect a generic failure more reliably than the conventional flight control system, in which the comparing section 213 receives the actuator control signal 100b before converted by the digital analog converter 330 because of the fact that the comparing section 213 receives the actuator control signal 100b, which is the same in configuration as the actuator control signal 100b to be outputted to the actuator 400.

While it has been described in the above that the comparing section 213 is operative to receive the actuator control signal 100b in analog format converted by the digital analog converter 330, the comparing section 213 of the flight control system 100 according to the present invention may receive the actuator control signal 100b before converted by the digital analog converter 330 unless the actuator control signal 100b outputted by the ACC processor 320 to the comparing section 213 is not different in configuration from the actuator control signal 100b outputted by the ACC processor 320 to the digital analog converter 330.

The flight control system 100 according to the present invention, in which the ACC 300 further comprises a control prevention section 350 for preventing the actuator 400 from being controlled by the ACC 300, the comparing section 213 is operative to compare the actuator control signal 100b generated by the ACC processor 320 with the reference signal 100c generated by the FCC processor 210 to generate a control prevention signal 100d in accordance with the result of the comparison, and the control prevention section 350 is operative to prevent the actuator 400 from being controlled by the ACC 300 in response to the control prevention signal 100d generated by the comparing section 213, can detect a generic failure as well as prevent the actuator from being controlled by failed ACC.

While it has been described in the above that the comparing section 213 is operated to compare the actuator control signal 100b with the reference signal 100c by judging whether the actuator control signal 100b is equal to the reference signal 100c or not, and determine that no generic failure occurs in the ACC processor 320 if it is judged that the actuator control signal 100b is equal to the reference signal 100c, the comparing section 213 of the flight control system 100 according to the present invention may compare the actuator control signal 100b with the reference signal 100c in a different manner and determine that no generic failure occurs in the ACC processor 320 in a different manner.

Furthermore, the flight control system 100 according to the present invention, the flight control system 100, in which the comparing section 213 is operative to output the control prevention signal 100*d* to the control prevention section 350 not through the ACC processor 320, can prevent the actuator from being controlled by failed ACC more reliably than the conventional flight control system in which the control prevention signal 100*d* is outputted to the control prevention section 350 through the ACC processor 320.

In the flight control system 100 according to the present invention, the comparing section 213 may form part of a processor other than the FCC processor 210 as long as the processor is not the ACC processor 320. The flight control system 100, in which the comparing section 213 forms part of the FCC processor 210, however, can prevent the actuator from being controlled by failed ACC immediately after the failure is detected, thereby reducing the effect on the aircraft caused by the failure occurred in the ACC processor 320 in comparison with the conventional flight control system in which the comparing section 213 forms part of a processor other than the FCC processor 210.

In order to attain the objects of the present invention, the above preferred embodiment of the flight control system 100 may be replaced with an alternative embodiment of the flight control system, which will be described hereinlater. The constitution elements and the parts of the alternative embodiment of the flight control system entirely the same as those of the above embodiment of the flight control system 100 will not be described but bear the same reference numerals and legends as those of the above embodiment of the flight control system 100 in FIG. 1 to avoid tedious repetition.

The alternative embodiment of the flight control system is similar in construction to the above preferred embodiment of the flight control system 100 except for the fact that the FCC processor 210 is operative to generate the reference signal 100*c* in accordance with FCC software, the ACC processor 320 is operative to generate the actuator control signal 100*b* in accordance with ACC software, and the comparing section 213 is operative to compare the actuator control signal 100*b* generated by the ACC processor 320 with the reference signal 100*c* generated by the reference signal generating section 212 wherein the FCC software is different in design from the ACC software.

According to the present invention, the alternative embodiment of the flight control system, in which the FCC processor 210 is operative to generate the reference signal 100*c* in accordance with FCC software, the ACC processor 320 is operative to generate the actuator control signal 100*b* in accordance with ACC software, and the comparing section 213 is operative to compare the actuator control signal 100*b* generated by the ACC processor 320 with the reference signal 100*c* generated by the reference signal generating section 212 wherein the FCC software is different in design from the ACC software, can detect a generic failure consequently occurring in the ACC processor 320 due to the characteristics inherent in the ACC software because of the fact that the FCC software is different from the ACC software in design. Preferably, the FCC software of the FCC 200 and the ACC software of the ACC 300 may be developed in different designing teams or manufacturers so that the FCC software and the ACC software are different in design.

The alternative embodiment of the flight control system thus constructed does not require suppliers to develop and produce additional software different from the ACC software in design in order to detect generic failures, thereby making it possible for the suppliers to reduce the development and manufacturing costs. The alternative embodiment of the flight control system thus constructed does not require suppliers to develop and produce additional software different from the ACC software in design in order to detect generic failures, which can reduce the development and manufacturing costs of the flight control system while enabling to prevent the actuator 400 from being controlled by failed ACC 300.

While it has been described in the above that the FCC processor 210 forming part of the FCC 200 should be different in design from the ACC processor 320 forming part of the ACC 300, the FCC processor 210 forming part of the FCC 200 may not be different in design from the ACC processor 320 forming part of the ACC 300 if the FCC software is different from the ACC software in design as described in the alternative embodiment of the flight control system according to the present invention.

As will be appreciated from the foregoing description, the flight control system according to the present invention does not require suppliers to develop and produce a plurality of ACC processors 320 different from one another in design and software in order to detect failures, thereby making it possible for the suppliers to reduce the development and manufacturing costs while enabling to detect generic failures consequently occurring due to the characteristics inherent in the ACC processor or software related to the ACC processor. Furthermore, the flight control system according to the present invention does not require suppliers to develop and produce a plurality of ACC processors 320 different from one another in design and software in order to detect failures, thereby making it possible for the suppliers to reduce the development and manufacturing costs while enabling to prevent an actuator from being controlled by failed ACC.

The many features and advantages of the invention are apparent from the detailed specification, and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described herein, and accordingly, all suitable modifications and equivalents may be construed as being encompassed within the scope of the invention.

What is claimed is:

1. A flight control system for controlling a flight of an aircraft, comprising:

an actuator for actuating flight control surfaces and outputting a feedback signal in return;

a flight control computer for operating said actuator; and an actuator control computer for controlling the operation of said actuator;

said flight control computer comprising:

an FCC processor for generating an instruction signal to operate said actuator on the basis of an operational instruction signal inputted from a pilot and a state signal indicative of the state of an aircraft, and generating a reference signal on the basis of said instruction signal and said feedback signal from said actuator, said actuator control computer comprising:

an ACC processor for generating an actuator control signal on the basis of said instruction signal generated by said FCC processor and said feedback signal from said actuator, and a servo amplifier for amplifying said actuator control signal generated by said ACC processor to be outputted to said actuator, said actuator is operative to actuate said flight control surfaces in accordance with said actuator control signal amplified by said servo amplifier and output a feedback signal in return, whereby said flight control computer further comprises:

a comparing section for comparing said actuator control signal generated by said ACC processor with said reference signal generated by said FCC processor to detect a failure, said FCC processor is different in design from said ACC processor.

2. The flight control system as set forth in claim 1, in which said FCC processor is operative to generate said reference signal in accordance with FCC software, said ACC processor is operative to generate said actuator control signal in accordance with ACC software, and said FCC software is different from said ACC software in design.

3. The flight control system as set forth in claim 1, in which said FCC processor is operative to receive said feedback signal from said actuator not through said ACC processor.

4. The flight control system as set forth in claim 1, in which said comparing section is operative to receive said actuator control signal generated by said ACC processor not through said ACC processor.

5. The flight control system as set forth in claim 1, in which said FCC processor comprises:

an instruction signal generating section for generating an instruction signal to operate said actuator on the basis of an operational instruction signal inputted from a pilot and a state signal indicative of the state of an aircraft, and a reference signal generating section for generating a reference signal on the basis of said instruction signal generated by said instruction signal generating section and said feedback signal from said actuator, and said comparing section is operative to compare said actuator control signal generated by said ACC processor with said reference signal generated by said reference signal generating section to detect a failure.

6. The flight control system as set forth in claim 1, in which said actuator control computer further comprises a digital analog converter for converting said actuator control signal generated by said ACC processor from digital to analog format to be outputted to said servo amplifier and said FCC processor, and said servo amplifier is operative to amplify said actuator control signal in analog format converted by said digital analog converter to be outputted to said actuator, and said comparing section is operative to compare said actuator control signal in analog format converted by said digital analog converter with said reference signal generated by said FCC processor to detect a failure.

7. The flight control system as set forth in claim 1, said actuator control computer further comprises a control prevention section for preventing said actuator from being controlled by said actuator control computer, said comparing section is operative to compare said actuator control signal generated by said ACC processor with said reference signal generated by said FCC processor to generate a control prevention signal in accordance with the result of the comparison, and said control prevention section is operative to prevent said actuator from being controlled by said actuator control computer in response to said control prevention signal generated by said comparing section.

8. The flight control system as set forth in claim 7, in which said comparing section is operative to output said control prevention signal to said control prevention section not through said ACC processor.

9. The flight control system as set forth in claim 1, in which said comparing section forms part of said FCC processor.

10. The flight control system as set forth in claim 1, further comprising a data bus for connecting said actuator control computer with said flight control computer so that said actuator control computer is operative to receive said instruction signal and said control prevention signal from said flight control computer and transmit said actuator control signal and said feedback signal to said flight control computer.

11. A flight control system for controlling a flight of an aircraft, comprising:

an actuator for actuating flight control surfaces and outputting a feedback signal in return;

a flight control computer for operating said actuator; and an actuator control computer for controlling the operation of said actuator;

said flight control computer comprising:

an FCC processor for generating an instruction signal to operate said actuator on the basis of an operational instruction signal inputted from a pilot and a state signal indicative of the state of an aircraft, and generating a reference signal on the basis of said instruction signal and said feedback signal from said actuator, said actuator control computer comprising:

an ACC processor for generating an actuator control signal on the basis of said instruction signal generated by said FCC processor and said feedback signal from said actuator, and a servo amplifier for amplifying said actuator control signal generated by said ACC processor to be outputted to said actuator, said actuator is operative to actuate said flight control surfaces in accordance with said actuator control signal amplified by said servo amplifier and output a feedback signal in return, whereby said flight control computer further comprises:

a comparing section for comparing said actuator control signal generated by said ACC processor with said reference signal generated by said FCC processor to detect a failure, said FCC processor is operative to generate said reference signal in accordance with FCC software, said ACC processor is operative to generate said actuator control signal in accordance with ACC software, and said FCC software is different from said ACC software in design.

* * * * *